United States Patent Office 3,182,503
Patented May 11, 1965

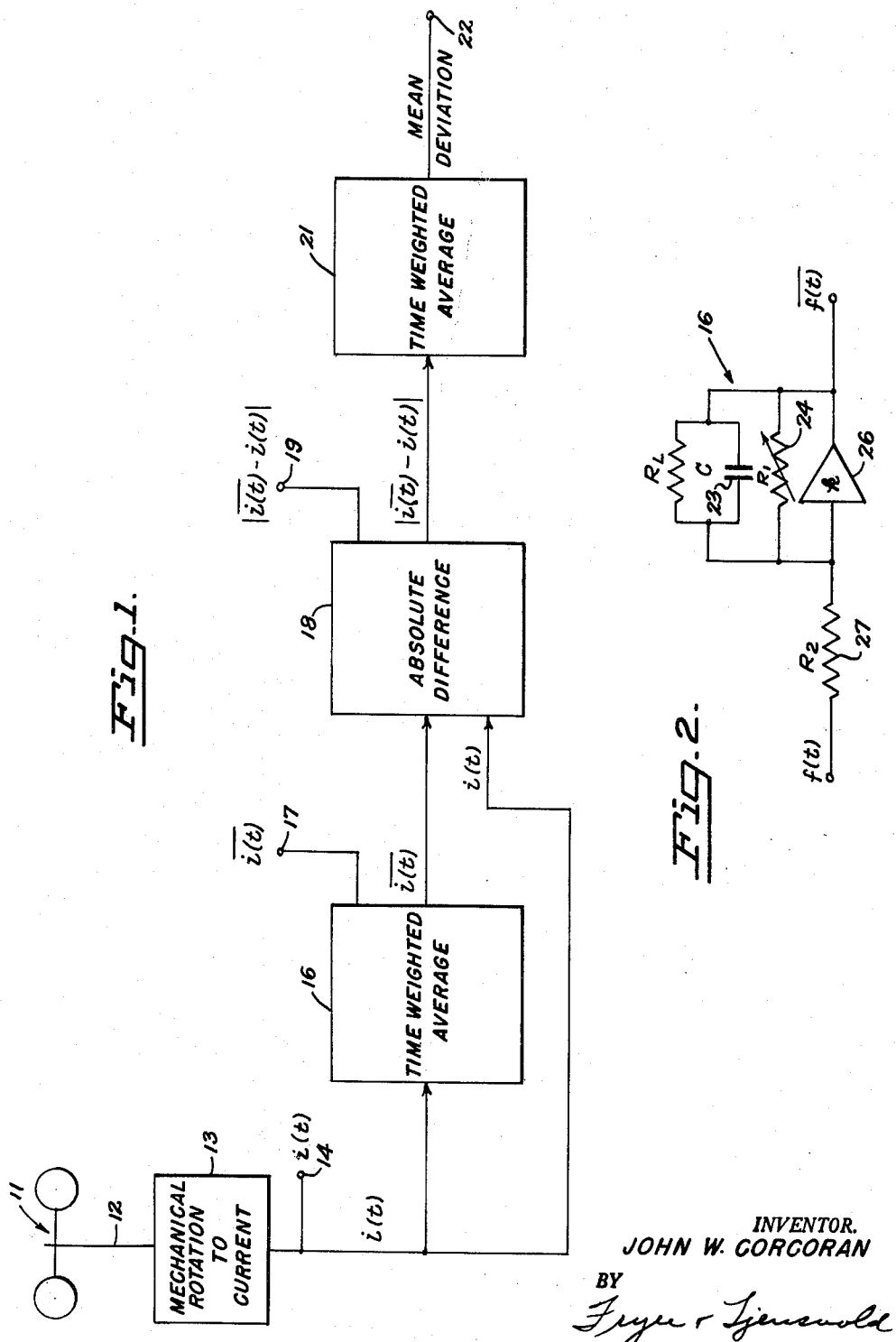

3,182,503
METEOROLOGIC INSTRUMENT
John W. Corcoran, Redwood City, Calif., assignor, by mesne assignments, to Beckman & Whitley, Inc., San Carlos, Calif., a corporation of Delaware
Filed Feb. 12, 1962, Ser. No. 172,732
6 Claims. (Cl. 73—229)

The present invention relates to meteorological instruments, and more particularly to improved means for obtaining wind velocity data.

Measurement of wind velocity has long been accomplished by means of anemometers. Although certain improvements in the structure of anemometers have been developed to allow very sensitive measurements to be taken, the method and means of recording the measurements obtained have remained basically the same for many years. Due to the advance of science in general, the once satisfactory means of handling anemometer data no longer supplies information at the time or in the form most needed for certain applications.

Now that meteorological studies are no longer restricted to purely scientific investigations, but are used for a variety of practical purposes, many of the old methods used for the purely scientific studies are no longer satisfactory. The method of handling the data received from anemometers is one such out-dated method.

The most common and widely used anemometers are of the cup-type which operate generally by disposing a plurality of cups attached to support arms so as to receive the wind. The cups and support arms are pivotally mounted to rotate in response to the wind at a rate which is proportional to the wind velocity. The rotating cups drive a central shaft the mechanical rotation of which is transduced to electrical energy which is proportional in magnitude or frequency to the wind velocity. The electrical energy is then used to drive a recording means which presents on paper charts a visual display of the wind's velocity. From these wind speed charts desired data is obtained.

A characteristic of wind velocity is that it has a general tendency to oscillate in magnitude about an average value. Although the magnitude of variance from the average wind velocity may not be great relative to the average velocity, its frequency is sufficient to expose a recording chart which records instantaneous wind velocity to a great number of pen strokes across the recording paper. Although all of the desired data is generally included in the recorded pen strokes, the accessibility of this data is not always of a high degree. The chart information may require many hours of manual processing to obtain certain desired data, or if computers are used, the information from the wind speed chart must be manipulated to be placed in the proper form to be received by a computer. Thus even when computers are used, the time to obtain certain data after the information from the anemometer has been recorded is considerable due to handling delay.

As mentioned above, time delays may not be of great importance to purely scientific investigations, but when meteorological instruments are used for practical purposes, time delays may greatly decrease the usefulness of the information obtained. An example of a practical situation where time delay is undesirable is the use of meteorological instruments in airports. The velocity of the wind is a condition that a pilot needs to know if proper considerations for landing and taking off of an airplane are to be accurately determined. This information is even more important to pilots of jet powered aircraft, who must commit to landing at least three minutes prior to touchdown.

When a pilot requests information as to wind velocity, he is not necessarily interested in the instantaneous wind velocity which is changing very rapidly. The pilot would like to know what the average value of the wind velocity is for a period of time of between 3 and 30 minutes (depending upon the general weather conditions, type of aircraft, etc.) prior to his request. He might also like to know what the maximum deviations from the average are (the gustiness of the wind) and the average deviation from the average (over some period of time) as an indication of the trend of the wind velocity.

The present invention provides an anemometer system which allows information as to average velocity, absolute deviation from the average velocity, and mean deviation from the average velocity, to be present simultaneously with the recording of the instantaneous wind velocity. The system also allows the averaging period to be varied from a fraction of a minute to more than 30 minutes, thus enabling a wide variety of useful applications. The invention operates by electronically processing the data in its original form as presented by the rotating shaft of the anemometer. The necessity for manual processing or manipulation is eliminated thereby allowing immediate results instead of delayed results.

Accordingly it is an object of the invention to provide an anemometer system which simultaneously with the presentation of information as to instantaneous wind velocity presents usable information as to average values of wind velocity.

It is another object of the present invention to provide an anemometer system which makes available usable information as to average wind velocity, instantaneous absolute deviation from the average wind velocity and mean deviation from the average wind velocity as well as instantaneous wind velocity, wherein the averaging period for the velocity and deviation are variable from a fraction of a minute to more than thirty minutes.

It is another object of the present invention to provide an electronic averaging means which furnishes continuous information in the form of electrical energy, which is more sensitive to data of most recent origin, and which can average over time periods of many minutes.

In the drawings:

FIG. 1 is a schematic block diagram of the system of the invention; and

FIG. 2 is an electrical schematic diagram of the averaging means of the invention.

Referring to FIG. 1, an anemometer 11 provides mechanical rotation of a shaft 12, the speed of which is proportional to the driving wind. The rotation of shaft 12 is used to produce electrical current, the magnitude of which is proportional to the rotation speed of shaft 12, and thus to wind speed. The translation of mechanical rotation to electrical current is performed by transducing device 13 which may be any one of a number of devices commonly used for that purpose. The current that is delivered from transducer 13 varies in magnitude with variations of wind velocity which, in turn, are a function of time. Thus the current from device 13 is also a function of time and thus represented by $i(t)$.

Although anemometer 11 is indicated as the cup-type, other types of anemometers which furnish a source of electrical current $i(t)$, which is proportional to wind velocity are suitable for use with the present invention. Thus the invention depends generally upon a detection means which can furnish a current $i(t)$, where $i(t)$ relates to instantaneous wind velocity.

An electrical terminal 14 electrically connected directly to the output of transducer 13 provides a source of current $i(t)$, which is generally used to drive a recording means for visually displaying the instantaneous wind velocity. A supply of current $i(t)$ is also delivered to an averaging device 16. A number of means for obtaining the average value (or the approximate average value) of $i(t)$ are known in the art, and these include devices which are both electrical and non-electrical. In the preferred embodiment of the present invention, however, an electronic averaging device is used which will presently be described in detail. The average value $\overline{i(t)}$ of the current that is presented at the output of averager 16 is a time weighted average which is continuously available. Averager 16 will be described with reference to the performance of the device used in the preferred embodiment and herein described in detail; an averaging device having different performance would be used similarly. By having a continuous supply of current, which is functionally related to $i(t)$ by being the time weighted average thereof, rather than periodic outputs as would be obtained by integrating means, numerous important advantages are obtained. Among these advantages are the ability to have information as to the average wind velocity at every instant of time rather than merely at discrete intervals, the existence of an electrical signal which can be combined with other electrical signals or further acted upon to supply more information, etc. In certain respects a time weighted average is preferred to a non-weighted average in that changes in the average value are indicated more quickly. This follows from the fact that a time weighted average is the result of averaging over a given interval, with the most recent data given more weight in determining the overall average for the period.

An electrical connection terminal 17 provides an electrical signal from averaging device 16, wherein the signal is the time weighted average $\overline{i(t)}$ of the signal at terminal 14. Thus $\overline{i(t)}$, which is the time weighted average of wind velocity may be visually displayed by connecting an appropriate recording means to terminal 17. Signal $\overline{i(t)}$ from device 13 along with signal $i(t)$ from device 17 are introduced to an electronic circuit 18 which responds to two inputs by an output which is the absolute difference of the inputs. Numerous devices are known in the art which will give an output which is the absolute difference of two input signals, and reference to sources of analog circuitry will reveal a number of such devices.

The output of device 18, which is the absolute difference between the time weighted average value of the wind velocity as represented by electrical signal $\overline{i(t)}$ and the instantaneous value of wind velocity as represented by electrical signal $i(t)$, is a measure of the gustiness of the wind; information often desired. An electrical connection terminal 19 furnishes a supply of electrical signal which represents gustiness, $\overline{i(t)} - i(t)$, and thereby allows a recorder connected thereto to visually display this information.

By introducing the output signal from device 18 to a second averaging means 21, an electrical signal can be obtained which will represent the mean deviation of the wind velocity from the average value. In the same way that the average from device 16 is a time weighted average, the average from device 21 is time weighted. Terminal 22 makes the mean deviation signal $$\overline{\overline{i(t)} - i(t)}$$

available to instrumentation by supplying a source of output from device 21. Even though averaging devices 16 and 21 are both of the type which give a result which is time weighted, the averaging time to which each is adjusted does not necessarily have to be the same. They can be arranged to average over different time periods so as to produce the most meaningful information for a particular application.

The manner in which averaging devices 16 and 21 operate is best explained with reference to FIG. 2. A capacitor 23 is used as the basic averaging unit due to the natural relationship between a voltage and current acting thereon. This relationship is such that the voltage is the time weighted average of the current. The leakage resistance $R_L$ which exists in all capacitors to some extent and which must be considered in certain practical applications is shown in electrical parallel relationship to capacitor 23. A capacitor having a capacitance-leakage resistance product ($CR_L$) of about $5 \times 10^4$ megohm-microfarads is most advantageously used in the present invention. When a variable resistor 24 is connected in electrical parallel with capacitor 23 the parallel combination of leakage resistance $R_L$ and resistor 24 will be effectively equal to resistor 24 alone, as long as resistor 24 is at least an order of magnitude less than $R_L$. It is desirable, however, for the present invention, that the product of the magnitude of capacitor 23 and the magnitude of resistor 24 be as high as possible (the reason for this will be explained presently). Thus resistor 24 is of a value which renders resistance $R_L$ ineffective yet furnishes a high resistance-capacitance product. Thus for an $R_L$ of $5 \times 10^9$ ohms resistor 24 is advantageously $2 \times 10^8$ ohms. If capacitor 23 is 10 microfarads (a practical value) then the product of resistance and capacitance is 2000 (seconds) for a circuit having the values as given above.

The parallel combination of capacitor 23 and variable resistor 24 is connected in electrical parallel to an operational amplifier 26. Operational amplifier 26 has the general well known characteristics of operational amplifiers used in analog computer electronics, which includes a very high gain $k$. Whereas a gain $k$ of about 100 is sufficient for the present invention, a $k$ of about 1000 or more is to be preferred.

Amplifier 26 is in series connection with a resistor 27 which receives an incoming signal $f(t)$. $f(t)$ represents any electrical signal which is a function of time and $\overline{f(t)}$ represents that signal after it passes through device 16 (or 21). $\overline{f(t)}$ is the time weighted average of $f(t)$, over a time period determined by the time constant of the circuit.

The time constant T of device 16 is given by the expression $$T = R_c C \qquad (1)$$

where C is the value of capacitor 23 in farads and $R_c$ is given by the expression $$\frac{1}{R_c} = \frac{1}{R_1} + \frac{1}{kR_2} \qquad (2)$$

where $R_1$ is the ohmic value of resistor 24 and $R_2$ is the ohmic value of resistor 27. $R_1$ is really representative of the parallel combination of resistor 24 and $R_L$ which can be accurately approximated by the value of resistor 24 when their relative values are as stipulated above. If the values of $R_1$ and $R_2$ are kept nearly equal, and the gain, $k$, of amplifier 26 is 100 or more, $R_c$ will be approximately equal to $R_1$ (resistor 24). Since it is desirable to vary the ohmic value of resistor 24 ($R_1$), designing the circuit so that the greatest value of $R_1$ desired does not destroy the approximation that $R_c = R_1$, will insure that the approximation will be valid for all values of $R_1$. When $k$ is about 1000 the approximation of $R_c = R_1$ is accurate to a high degree. Thus the time T over which $\overline{f(t)}$ is calculated is equal to the product of resistor 24 and capacitor 23. The requirement that this product be high, as per supra, is seen to be for the reason of making it possible to have averages calculated over extended periods of time. By reducing the value of vehicle resistor 24 the averaging period can be decreased. When T is equal to 2,000 seconds as by the use of the values given above, the averaging period is greater than 30 minutes. The same circuit can be adjusted by varying resistor 24, to have an averaging period of 0.167 minute or less without changing the general overall performance of the circuit.

The average $\overline{f(t)}$ of signal $f(t)$ is not an arithmetic average obtained by short period integration. It is an average over a specified period, where that period terminates at the instant of the measurement, and the weight given to the values of the function being averaged, decreases in an exponential manner from 1 at the instant of measurement and asymptotes to zero at times prior to the taking of the measurement. More simply, the information in capacitor 23 is continuously being forgotten as new information is received with the information decreasing in importance during the time (T) which it remains in the capacitor. This type of averaging system has a number of distinct advantages over conventional averaging systems. The averaging period can be made long (minutes, whereas other systems operate only for seconds), the information is continuously available rather than only at discrete intervals, and the information can be directly used to operate other circuitry or combine with other information.

Thus, the present invention provides a system having numerous advantages over similar systems known in the art and thereby provides a tool having usefulness in many areas where it has heretofore not been advantageous to use at all.

Although numermous specific examples as to numerical values of components appear in the above description, numerous modifications thereto will be apparent to those skilled in the art.

What is claimed is:

1. In a meteorological instrument for wind velocity measurements the combination comprising an anemometer responsive to wind by the generation of a first electrical signal which is proportional to the velocity of said wind, an averaging means for receiving said first signal and responding thereto by the output of a second signal which is continuous and an average of said first signal, electronic means for receiving said first and second signals and responding thereto by the output of a third signal which is the absolute difference between said first and second signals, and second averaging means for receiving said third signal and being responsive thereto by the output of a fourth signal which is continuous and an average of said third signal.

2. The meteorological instrument of claim 1 wherein said averaging means produce outputs which are the time weighted average of their inputs and average over time periods of up to thirty minutes.

3. In a meteorological instrument for wind velocity measurements the combination comprising,
an anemometer responsive to wind by the generation of an electrical signal which is proportional to the velocity of the wind; and
an electrical averaging means disposed to receive the electrical signal of said anemometer and responsive thereto to provide an output signal which is continuous in time and functionally related to the electrical signal of said anemometer by being the time weighted average thereof, said averaging means comprising a capacitor having leakage resistance, a variable resistor in electrical parallel connection with said capacitor wherein the maximum ohmic value of said variable resistor is at least a factor of ten less than the leakage resistance, and an operational amplifier having a gain of at least 100 in electrical parallel connection with said variable resistor.

4. The meteorological instrument of claim 3 further comprising a resistor connected between said anemometer and said amplifier wherein the value of said resistor is approximately equal to the maximum value of said variable resistor.

5. In an electronic device for obtaining a time weighted average of an electrical signal which is a function of time the combination comprising a capacitor having leakage resistance, a variable resistor in electrical parallel connection with said capacitor wherein the maximum ohmic value of said variable resistor is at least a factor of ten less than said leakage resistance, an operational amplifier having a gain of at least 100 in electrical parallel connection with said variable resistor, and a fixed value resistor connected in electrical series with said amplifier wherein a signal to be operated upon is introduced to the unconnected side of said fixed value resistor, said fixed value resistor having an ohmic value approximately equal to the maximum value of said variable resistor.

6. In an electronic device for obtaining a time weighted average over a time of up to 30 minutes of an electrical signal which is a function of time the combination comprising a capacitor having leakage resistance, a variable resistor in electrical parallel connection with said capacitor wherein said maximum ohmic value of said variable resistor is at least a factor of ten less than said leakage resistance and the mathematical product of the maximum value of said variable resistor in ohms and the capacitance of said capacitor in farads is at least 1800, an operational amplifier in parallel connection with said vriable resistor wherein the gain of said amplifier is at least 100, and a fixed value resistor having ohmic value approximately equal to the maximum ohmic value of said variable resistor wherein said fixed value resistor is connected in electrical series with said amplifier and said signal to be averaged is introduced to the unconnected side of said fixed value resistor.

References Cited by the Examiner

UNITED STATES PATENTS

| 2,259,615 | 10/41 | Chappell et al. | 73—229 |
| 2,514,948 | 7/50 | Gross | 73—229 |
| 2,742,783 | 4/56 | Jasse | 73—231 X |
| 2,958,826 | 11/60 | Birge | 328—127 |
| 3,047,808 | 7/62 | Gray | 328—127 |

FOREIGN PATENTS

| 667,123 | 2/52 | Great Britain. |

OTHER REFERENCES

Article entitled "Wide Range Recording Anemometer"; by A. N. Rapsey; from Journal of Scientific Instruments, vol. 36, February 1959, pp. 63–66.

RICHARD C. QUEISSER, *Primary Examiner.*

ROBERT L. EVANS, JOSEPH P. STRIZAK, *Examiners.*